United States Patent
Murakami et al.

[11] Patent Number: 5,207,975
[45] Date of Patent: May 4, 1993

[54] HYDRAULIC CONTROL ROD DRIVING SYSTEM

[75] Inventors: Youichirou Murakami; Zen-ichi Yoshida; Otomasa Mukouhara, all of Takasago; Chikara Kurimura; Kenji Umeda, both of Kobe, all of Japan

[73] Assignee: Mitsubishi Jukogyo Kabushiki Kaisha, Tokyo, Japan

[21] Appl. No.: 798,091

[22] Filed: Nov. 27, 1991

[30] Foreign Application Priority Data

Nov. 27, 1990 [JP] Japan .................. 2-320723

[51] Int. Cl.⁵ .................................................. G21C 7/16
[52] U.S. Cl. .................................... 376/230; 376/219
[58] Field of Search ............... 376/230, 219, 231; 976/117, 127

[56] References Cited

U.S. PATENT DOCUMENTS

| | | | |
|---|---|---|---|
| 3,122,045 | 2/1964 | Zilberfarb | 376/230 |
| 3,462,345 | 8/1969 | Jabsen | 376/231 |
| 3,486,975 | 12/1969 | Ripley | 376/230 |
| 3,575,804 | 4/1971 | Ripley | 376/230 |
| 3,855,060 | 12/1974 | Dietrich et al. | 376/230 |
| 3,933,581 | 1/1976 | McKeehan et al. | 376/231 |
| 4,489,036 | 12/1984 | Jamrus | 376/230 |

FOREIGN PATENT DOCUMENTS 955382 4/1964 United Kingdom .

Primary Examiner—Donald P. Walsh
Assistant Examiner—Frederick H. Voss
Attorney, Agent, or Firm—Jacobson, Price, Holman & Stern

[57] ABSTRACT

According to the present invention, there is provided a hydraulic control rod driving system in which radial clearance is formed between a piston portion and a cylinder, one or two or more step portions each composed of a cylindrical upper part having a large diameter and a cylindrical lower part having a small diameter arranged adjacent to the lower side of the upper part are provided on the piston portion along an axial direction thereof, circumferential grooves for partitioning off respective step portions are provided, and a ratio of the length of each step portion to the maximum outside diameter of the piston portion is set at 0.5 to 1.0.

2 Claims, 6 Drawing Sheets

F I G. 1
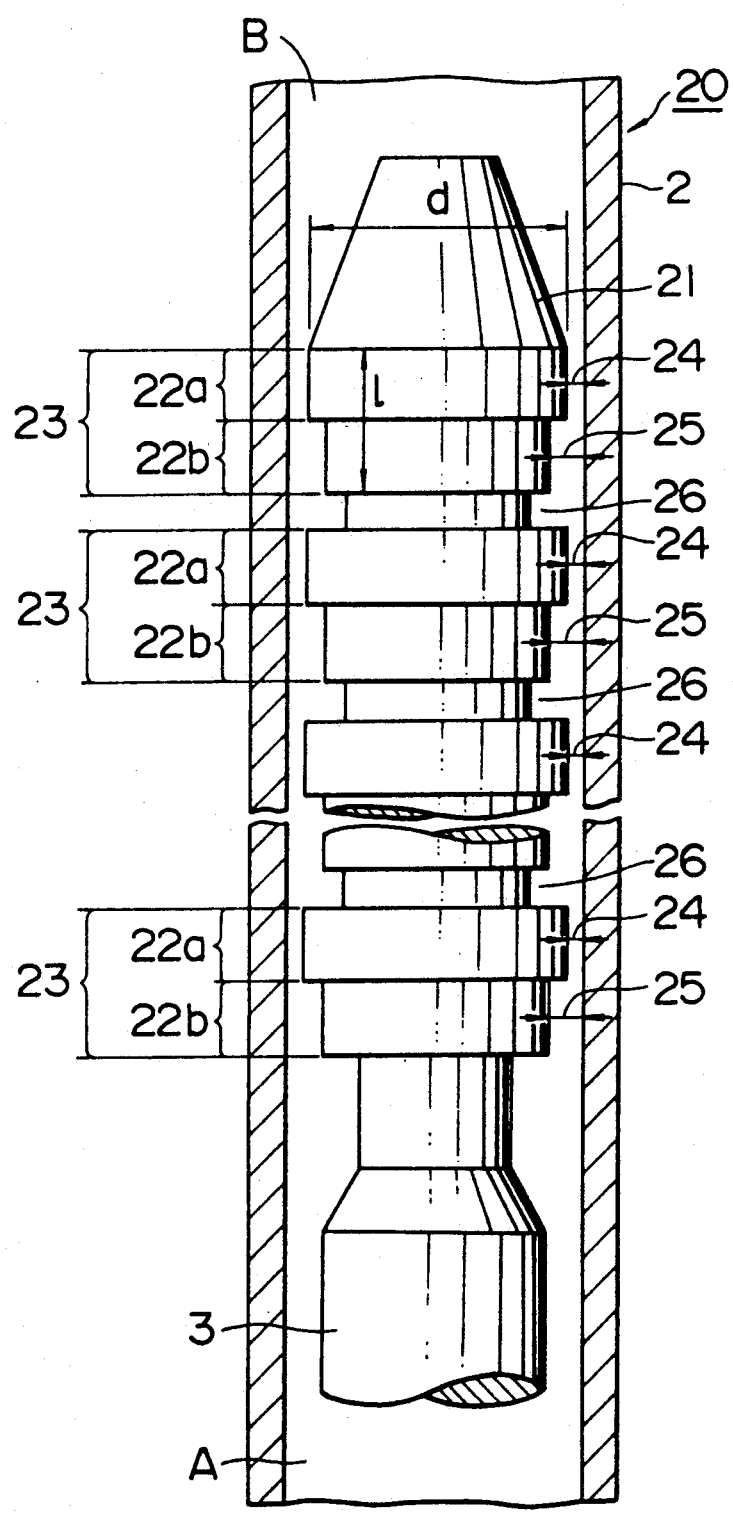

HYDRAULIC CONTROL ROD DRIVING SYSTEM

FIELD OF THE INVENTION AND RELATED ART STATEMENT

The present invention relates to a hydraulic control rod driving system of a reactor, and more particularly to a configuration of a piston portion formed at an upper end of a driving shaft.

Start-up, shut-down and power change of a reactor are performed by putting a control rod in and out a reactor core. Further, the control rod is driven by means of a control rod driving system fitted to a reactor vessel cover. There have been heretofore various types of control rod driving systems, but one of them is a hydraulic driving system.

FIG. 5 shows a structure of a conventional hydraulic control rod driving system schematically. The control rod driving system 1 includes a cylinder 2 installed vertically on a reactor vessel cover (not shown) and a driving shaft 3 which extends into the cylinder 2 penetrating through the reactor vessel cover coupled with a spider (not shown) of a control rod cluster, and moves the driving shaft 3 vertically so as to put the control rod cluster in and out a reactor core by controlling fluid pressure above and under a piston portion 4 formed at an upper end of the driving shaft 3. The inside of the cylinder under the piston portion 4 forms a high pressure side A since it communicates with the inside of the reactor vessel, and the inside of the cylinder above the piston portion 4 forms a low pressure side B. Pipes 7 and 8 provided with switching valves 5 and 6 extend from the high pressure side A and the low pressure side B of the cylinder 2, respectively. These pipes 7 and 8 are connected to a pipe 9 which is opened to atmospheric pressure side. The pipe 9 is provided with a switching valve 10.

When the switching valve 5 of the tube 7 is closed, and the switching valves 6 and 10 are opened in such a structure, the low pressure side B is opened to the atmospheric pressure side, a force acting on the piston portion 4 by the difference between fluid pressure, above and below, becomes larger than the dead weight of the driving shaft 3, and the driving shaft 3 moves upward. Further, when the switching valve 5 is opened gradually in a state that the switching valve 10 is closed and the switching valve 6 is opened, the differential pressure between the high pressure side A and the low pressure side B becomes smaller, and the driving shaft 3 moves downward by the dead weight thereof.

In FIG. 5, a reference numeral 11 denotes a bearing provided at the lower part of the cylinder 2, which supports the driving shaft 3 radially. Further, radial clearance is formed between the piston portion 4 and the cylinder 2 so that both do not come in contact with each other. If the stroke of vertical movement of the driving shaft 3 becomes longer, however, there is such a possibility that the piston portion 4 at the upper end of the driving shaft 3 runs out from the central axis of the cylinder 2 and comes in contact with the internal surface of the cylinder 2. Thus, generally, piston packings 12 have been heretofore fitted to the piston portion 4 of the driving shaft 3 so as to support the driving shaft 3 radially at two locations, upper and lower, as shown in FIG. 6 in addition to the bearing 11.

FIG. 7 shows a hydraulic control rod driving system which is used practically in a reactor in a more concrete manner. In this control rod driving system 1, the cylinder 2 is fitted as one body in a housing 14 which is fixedly attached to a reactor vessel cover 13. Further, metallic piston rings 17 are fitted to the piston portion 4 at the upper end of the driving shaft 3 coupled with a spider 16 of a control rod cluster 15, thereby to support the driving shaft 3 radially and also to generate a driving force. In the structure shown in FIG. 7, the driving shaft 3 is supported radially by means of the piston rings 17 only, and no bearing is provided at the lower part of the cylinder 2.

As described previously, in the control rod driving system shown in FIG. 5, there is a fear that the piston portion moves vertically in a state that the piston portion is in contact with the internal surface of the cylinder in case the stroke of vertical movement of the driving shaft is long, thus damaging the internal surface of the cylinder.

When piston packings 12 are added to the piston portion 4 as shown in FIG. 6, the piston portion 4 does not come in contact directly with the cylinder 2, but smooth movement of the driving shaft is impeded sometimes since piston packings are always in contact with the internal surface of the cylinder. Further, since the piston packings slide on the internal surface of the cylinder, there is the possibility that the internal surface of the cylinder is damaged in this case, too.

Furthermore, in such a type that uses piston rings as shown in FIG. 7, contact between the piston ring and the cylinder is made between metals, and metallic adhesion is produced thereby to prevent smooth movement of the driving shaft where there is a foreign matter or a flaw on the internal surface of the cylinder.

OBJECT AND SUMMARY OF THE INVENTION

It is an object of the present invention to provide a hydraulic control rod driving system which makes a piston portion of a driving shaft movable vertically without coming in contact with the cylinder so as to solve above-described conventional technical problems.

In order to achieve above-described object, in a hydraulic control rod driving system according to the present invention, radial clearance is formed between the piston portion and the cylinder, one or two or more step portions composed of a cylindrical upper part having a large diameter and a cylindrical lower part having a small diameter arranged adjacent to the lower side of the upper part are provided on the piston portion along an axial direction thereof, circumferential grooves for partitioning off each of the step portions are provided, and the ratio of the length of each step portion to the maximum outside diameter of the piston portion is set at 0.5 to 1.0.

In the above-described structure, the fluid flows from the high pressure side under the piston portion to the upper low pressure side through radial clearance between the piston portion and the cylinder. The operation at respective step portions at this time is as follows. That is, pressure distribution in an axial direction between the piston portion and the cylinder is determined by the ratio of the size $h_i$ of an inlet portion (high pressure side) to the size $h_o$ of an outlet portion (low pressure side) of the radial clearance. In case $h_i = h_o$, the pressure drops at a constant rate from the high pressure side to the low pressure side. Whereas, when $h_i/h_o$ becomes larger as in the present invention, the rate of pressure drop between the lower part of the piston portion and the cylinder becomes smaller. Accordingly, when the central axis of the piston portion runs out of the central axis of the cylinder, $h_i/h_o$ on the runout side becomes larger than that on the opposite side and the pressure on the runout side becomes larger than the pressure on the opposite runout side. As a result, a force which is going to return the runout acts on each step portion of the piston portion, and the piston portion is always held in a concentric state with respect to the cylinder.

Further, a plurality of step portions each composed of an upper part having a large diameter and a lower part having a small diameter are provided, and circumferential grooves are also provided as partitions among respective steps. Therefore, it is possible to set the ratio of the length of each step portion to the maximum outside diameter of the piston portion at 0.5 to 1.0. At this ratio, the greater part of the flow along the piston portion shows the axial direction and almost no flow is produced in the circumferential direction, which will be described in detail later. Thus, the maximum restoring force is applied to the piston portion.

BRIEF DESCRIPTION OF THE DRAWINGS

FIG. 1 is a sectional view showing a piston portion of a driving shaft in a hydraulic control rod driving system according to the present invention;

DETAILED DESCRIPTION OF PREFERRED EMBODIMENTS

Preferred embodiments of the present invention will be described in detail hereinafter with reference to the drawings.

Figure 5:
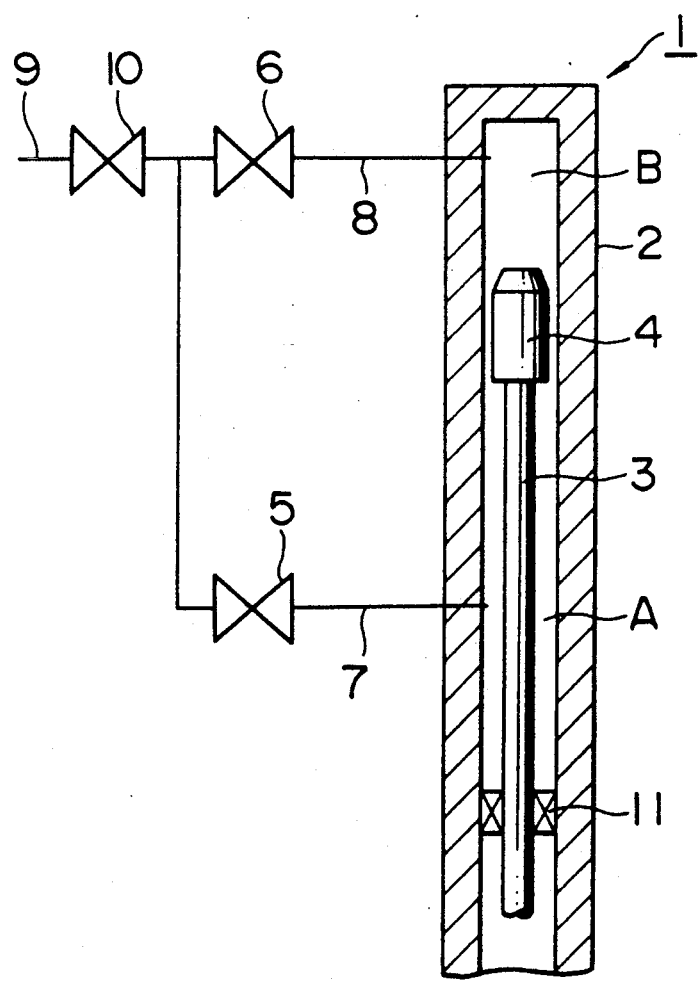
FIG. 5 is a schematic explanatory view showing a basic structure of a conventional hydraulic control rod driving system.
Figure 6:
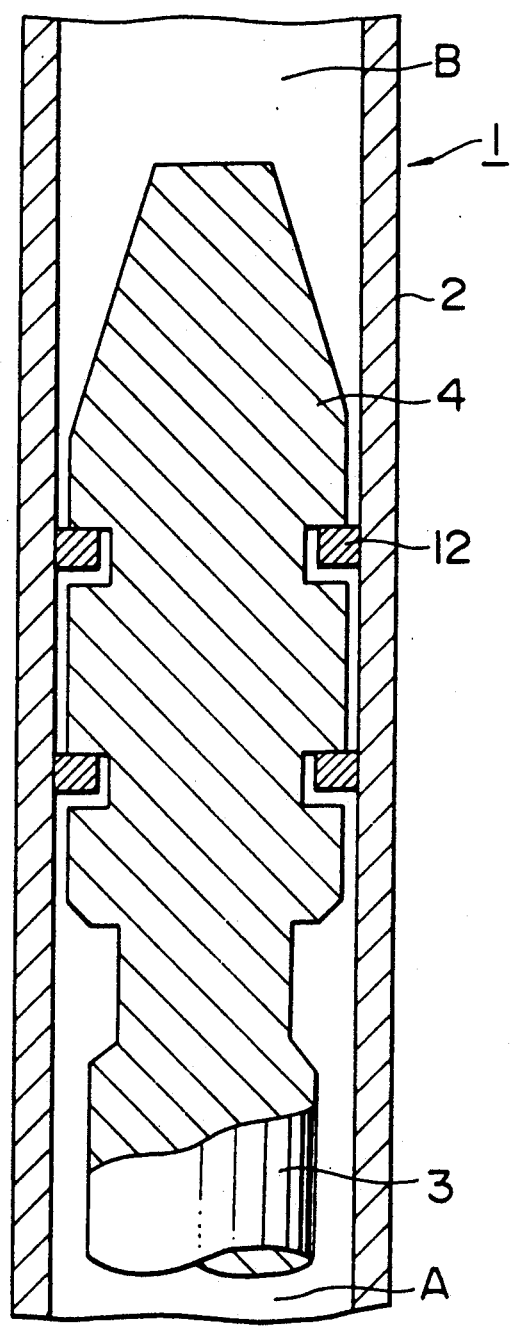
FIG. 6 is a sectional view showing a state that piston packings are fitted to a conventional piston portion.
Figure 7:
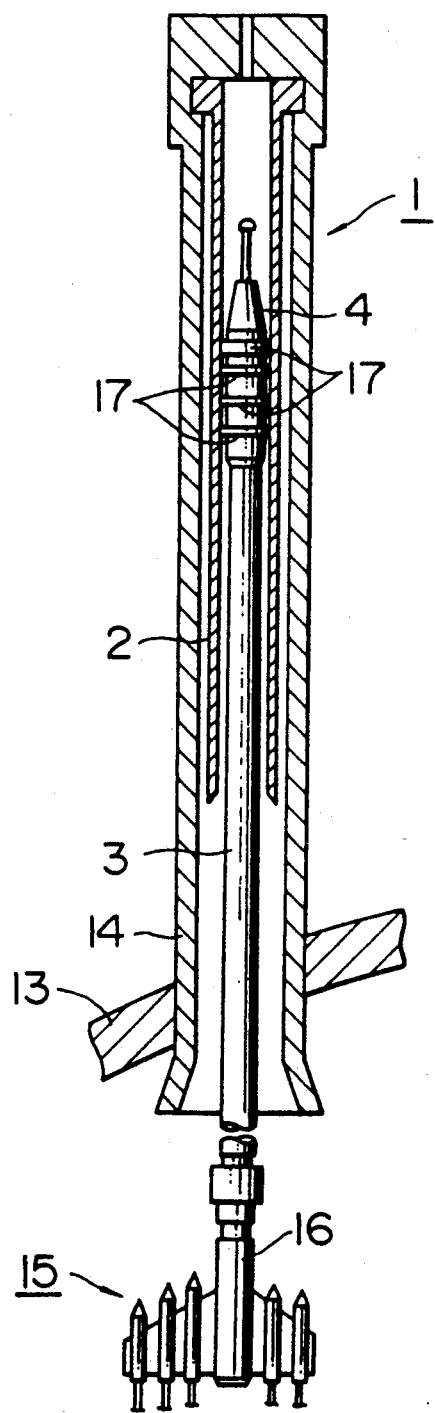
FIG. 7 is a sectional view showing a conventional hydraulic control rod driving system fitted to a reactor in the concrete.

FIG. 1 shows a piston portion 21 of a control rod driving system 20 formed in accordance with the present invention. The basic construction of the control rod driving system 20 is the same as those shown in FIG. 5 and FIG. 6 which have been described previously, and includes a cylinder fitted vertically to a reactor vessel cover (not shown) and a driving shaft 3 which extends into the cylinder 2 while penetrating through the reactor vessel cover. The piston portion 21 is formed at an upper end of the driving shaft 3, and the driving shaft 3 is moved vertically by regulating the fluid pressure above and under the piston portion 21, thereby to put a control rod cluster (not shown) coupled with the lower end of the driving shaft 3 in and out a reactor core.

According to the present invention, a plurality of steps 23 each consisting of a cylindrical upper part 22a and a cylindrical lower part 22b are provided axially on the piston portion 21 at the upper end of the driving shaft 3. In each step portion 23, the lower part 22b is arranged adjacent to the lower side to the upper part 22a, and the outside diameter of the lower part 22b is smaller than the outside diameter of the upper part 22a. Further, in each step portion 23, radial clearances 24 and 25 are provided between the inner wall of the cylinder 2 and the upper part 22a and the lower part 22b of the piston portion 21. Furthermore, circumferential grooves 26 are provided for partitioning the step portion 23 in each step.

In such a construction, the fluid flows from the high pressure side A under the piston portion 21 to the low pressure side B on the upper side through radial clearances 24 and 25 in respective step portions 23 between the piston portion 21 and the cylinder 2 and circumferential grooves 26 partitioning respective step portions 23 while a reactor is in operation.

Figure 2:
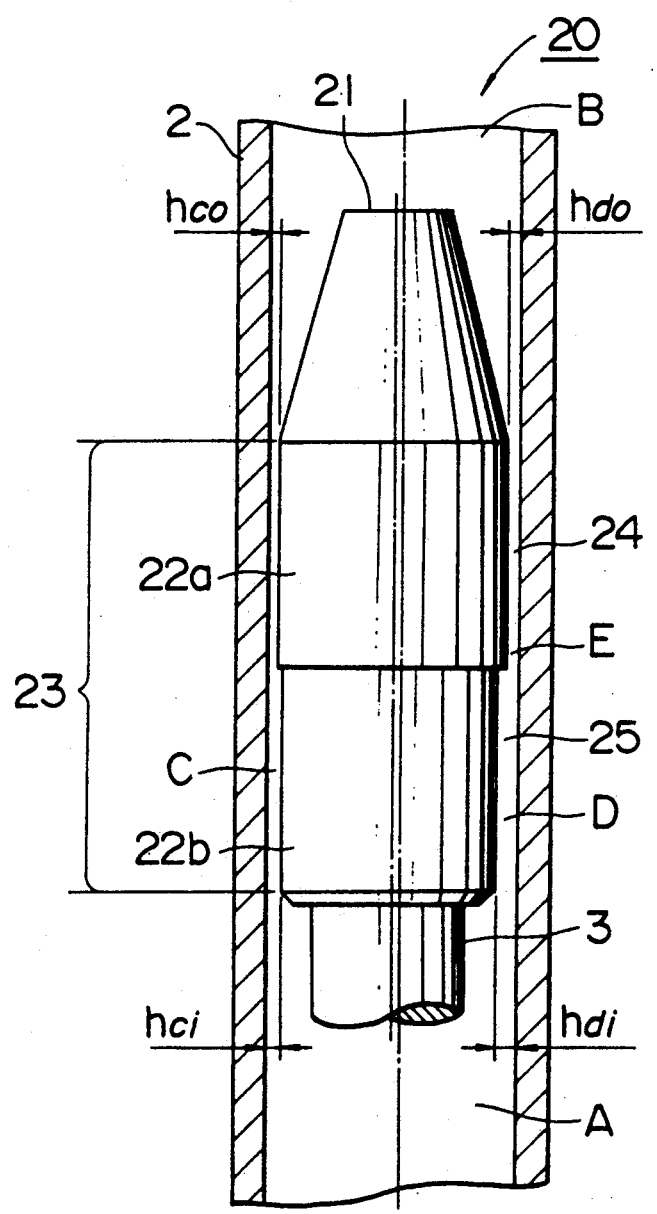
FIG. 2 is an explanatory view for explaining the operation of the present invention with a model of a piston portion having only one step portion, and shows a state that the piston portion runs out with respect to the cylinder.

The operation of respective step portions 23 at this time will be described hereinafter with reference to FIG. 2 showing a model in which only one step portion 23 is provided in the piston portion 21.

When the piston portion 21 runs out of the central axis of the cylinder 2 in one direction (left direction in the figure) as shown in FIG. 2 in a state that the fluid is flowing, the pressure distribution in the radial clearances 24 and 25 changes. Now, when it is assumed that the eccentric side is named C and the opposite eccentric side is named D, the size $h_{ci}$ of the radial clearance 25 on the high pressure side of the eccentric side C and the size $h_{co}$ of the radial clearance 24 on the low pressure side thereof become smaller than the size $h_{di}$ of the radial clearance on the high pressure side and the size $h_{do}$ of the radial clearance on the low pressure side of the opposite eccentric side D, respectively. Therefore, the relationship of the ratio of clearance on the high pressure side to the low pressure side becomes as follows.

$h_{ci}/h_{co} > h_{di}/h_{do}$

Figure 3:
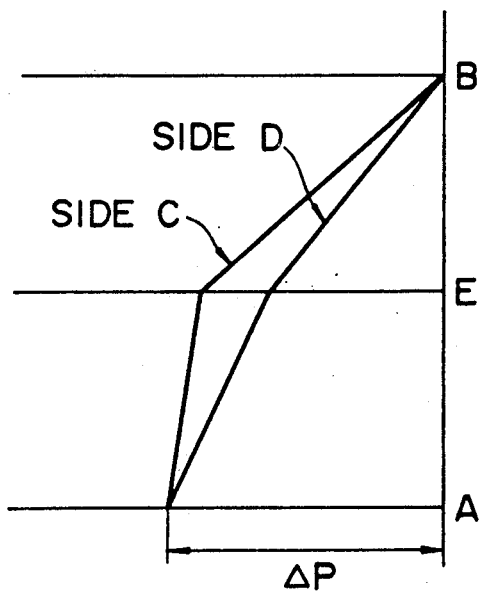
FIG. 3 is a graph showing axial pressure distribution in a radial clearance in a state shown in FIG. 2.

Since the bigger the ratio is, the smaller the ratio of pressure drop in the radial clearance 25 on the high pressure side becomes smaller as described previously, radial pressure distribution on the eccentric side C and the opposite eccentric side D appears as shown in FIG. 3.

In FIG. 3, a point E corresponds to a portion E where the outside diameter of the piston portion 21 changes, and the rate of pressure drop changes at the point E. As it is realized from FIG. 3, the sum of radial fluid pressure on the eccentric side C becomes bigger than the sum of the fluid pressure on the opposite eccentric side D, and a force is applied to the piston portion 21 in the direction that the eccentricity with respect to the cylinder 2 becomes smaller by pressure difference between them, thus maintaining the piston portion 21 always in a concentric state. Thus, a non-contact state is maintained between the piston portion 21 and the cylinder 2. The operation and effects are equivalent also in the case that one or two or more step portions 23 are provided as the construction of the present invention.

On the other hand, it is required to reduce the flow quantity in the radial direction flowing in the radial clearance between the piston portion 21 and the cylinder 2 in order to stabilize vertical actuation of the driving shaft 3 of the hydraulic control rod driving system 20. For such a purpose, it is thinkable to make the length l of the cylindrical upper portion 22a and the cylindrical lower portion 22b in FIG. 1 of each step portion 23 longer so as to increase the resistance of the passage in the axial direction. When the resistance of the passage in the axial direction is increased, however, the flow quantity flowing through radial clearances 24 and 25 between the piston portion 21 and the cylinder 2 is reduced. When the magnitudes of passage resistances both in the axial direction and the circumferential direction are compared with each other, it is found that the passage resistance in the axial direction is larger than the passage resistance in the circumferential direction. Therefore, the fluid flows in the circumferential direction. Thus, with reference to FIG. 3, the difference between the pressure distribution in the radial clearance on the eccentric side C and the opposite eccentric side D becomes small. Accordingly, the force (restoring force) for maintaining the piston portion 21 in a concentric state becomes smaller, and non-contact state between the piston portion 21 and the cylinder 2 is apprehended.

Figure 4:
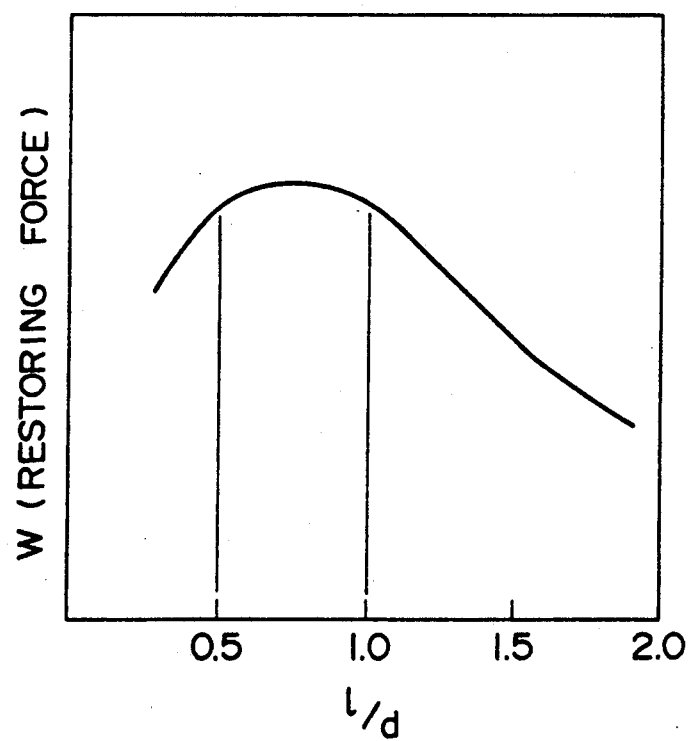
FIG. 4 is a graph showing the relationship between a ratio (l/d) of the length of each step portion to the outside diameter of the piston portion and a restoring force (W)

Further, the restoring force of the piston portion 23 per one step depends on the configuration of the piston. As the configuration parameters, there are a ratio of l to d in FIG. 1, a ratio of the clearance 24 to the clearance 25 in FIG. 1, and a ratio of the axial length 22a to 22b in FIG. 1. Further, a value showing an optimum value of the restoring force exists with respect to each parameter. In particular, the parameter which exerts a big influence upon the restoring force is l/d. When the clearance ratio, the length ratio, the cylinder diameter and the cylinder differential pressure which are parameters other than l/d are made constant, the restoring force becomes small in the region where l/d is small as it is seen from the fact that BA in FIG. 3 becomes shorter since the axial length becomes shorter and the area of the location showing the restoring force in FIG. 3 becomes smaller. Further, in the region where l/d is big, the pressure distribution on the eccentric side and the opposite eccentric side is equalized (the side C and the side D in FIG. 3 approaching to each other) because of the fact that the axial length gets longer but a circumferential flow is produced. With this, the restoring force becomes smaller due to the fact that the area of the location showing the restoring force in FIG. 3 becomes smaller. With the foregoing, it is comprehended that l/d has a point where the restoring force reaches the maximum. FIG. 4 shows the result of computing that value. As it is seen from FIG. 4, l/d where the restoring force reaches the maximum is at 0.5 to 1.0.

According to the present invention, a plurality of step portions 23 are formed. Accordingly, it is possible to set l/d of each step portion 23 at 0.5 to 1.0, to control the flow flowing through the clearance between the piston portion 21 and the cylinder 2 in the circumferential direction, and to maintain the maximum restoring force. Moreover, since the total length of the piston portion 21 can also be made long, it is possible to reduce the flow quantity flowing through the clearance in the axial direction so as to aim at stabilization of vertical movement of the piston portion 21.

As described above, according to the present invention, it is possible to produce hydrostatic bearing effects on the piston portion by forming the configuration of the piston portion into a step-shaped configuration composed of an upper part having a large diameter and a lower part having a small diameter. Furthermore, by forming the step-shaped configuration into a plurality of steps and providing circumferential grooves which partition the step portions, it is possible to set the ratio of the length of each step portion to the maximum outside diameter of the piston portion at 0.5 to 0.1 and to maximize the restoring force of the piston portion. Thus, the piston portion is always maintained in a concentric state with respect to the cylinder, thus preventing contact between both of them. Therefore, there is no fear that the piston portion comes in contact with the internal surface of the cylinder and damages it, and vertical movement of the driving shaft is also performed smoothly. Thus, it is possible to aim at improvement of actuation characteristics of the control rod driving system.

In addition, since it is possible to reduce the flow quantity flowing in the axial direction through the radial clearance between the piston portion and the cylinder, it is possible to stabilize all the more vertical movement of the driving shaft.

I claim:

1. A hydraulic control rod driving system provided with a cylinder installed on a reactor vessel cover and a driving shaft which is coupled with a control rod cluster, extends into said cylinder while penetrating through said reactor vessel cover and has a piston portion at an upper end thereof, in which said driving shaft is moved vertically by controlling fluid pressure above and under said piston portion, characterized in that:
   radial clearance is formed between said piston portion and said cylinder;
   step portions each composed of a cylindrical upper part having a large diameter and a cylindrical lower part having a small diameter arranged adjacent to the lower side of said upper part are provided on said piston portion along an axial direction thereof;
   circumferential grooves for partitioning said respective step portions are provided; and
   a ratio of the length of each step portion to the maximum outside diameter of said piston portion is set at 0.5 to 1.0.

2. A hydraulic control rod driving system according to claim (1), wherein at least two or more step portions are provided.

* * * * *